(12) United States Patent
Boocock (10) Patent No.: US 8,216,352 B2
(45) Date of Patent: Jul. 10, 2012

(54) NON-CHROMATE CORROSION INHIBITOR FORMULAS BASED ON HIGHLY CRYSTALLINE HYDROTALCITE ANALOGS

(75) Inventor: Simon K. Boocock, Liberty Township, OH (US)

(73) Assignee: The Shepherd Color Company, Cincinnati, OH (US)

( * ) Notice: Subject to any disclaimer, the term of this patent is extended or adjusted under 35 U.S.C. 154(b) by 902 days.

(21) Appl. No.: 12/211,390

(22) Filed: Sep. 16, 2008

(65) Prior Publication Data

US 2009/0081467 A1 Mar. 26, 2009

Related U.S. Application Data

(60) Provisional application No. 60/973,858, filed on Sep. 20, 2007.

(51) Int. Cl.
*B01J 21/00* (2006.01)
(52) U.S. Cl. .............. 106/14.05; 423/65; 428/615
(58) Field of Classification Search .......... 502/62, 502/80, 84; 106/14.05; 428/615; 423/65
See application file for complete search history.

(56) References Cited

U.S. PATENT DOCUMENTS

| | | | |
|---|---|---|---|
| 4,774,212 A * | 9/1988 | Drezdon ............... | 502/62 |
| 4,774,213 A | 9/1988 | Schneider et al. | |
| 4,843,168 A | 6/1989 | Drezdon et al. | |
| 5,246,899 A | 9/1993 | Bhattacharyya | |
| 5,728,363 A | 3/1998 | Martin et al. | |
| 5,730,951 A | 3/1998 | Martin et al. | |
| 5,939,353 A | 8/1999 | Bhattacharyya et al. | |
| 6,077,885 A | 6/2000 | Hager et al. | |
| 6,156,696 A | 12/2000 | Albers et al. | |
| 6,221,472 B1 | 4/2001 | Nosu et al. | |
| 6,403,826 B1 | 6/2002 | Braig et al. | |
| 6,479,421 B1 | 11/2002 | Vierheilig | |
| 6,716,370 B2 | 4/2004 | Kendig | |
| 6,929,736 B2 | 8/2005 | Vierheilig | |
| 7,022,302 B2 | 4/2006 | Oza et al. | |
| 7,112,313 B2 | 9/2006 | Vierhilig | |
| 7,135,075 B2 | 11/2006 | Buchheit et al. | |

FOREIGN PATENT DOCUMENTS

WO WO 2008/118950 10/2008

OTHER PUBLICATIONS

Buchheit, R.G. et al., "Active corrosion protection and corrosion sensing in chromate-free organic coating," Progress in Organic Coatings, vol. 47 (2003) pp. 174-182.
Alblas, B.P. et al., "The Effect of Chloride Contamination on the Corrosion of Steel Surfaces: A Literature Review," Jr. PCE (Feb. 1997) pp. 16-25.
Khodakov et al., "Structure and Properties of Vanadium Oxide-Zirconia Catalysts for Propane Oxidative Dehydrogenation," Journal of Catalysis, vo. 177 (1998) pp. 343-351.
Morcillo, M., "Soluble sales: their effect on premature degradation of anticorrosive paints," Progress in Organic Coatings, vol. 36(3) (Jul. 1999) pp. 137-147.
Weller, M.T., "Where zeolites and oxides merge: semi-condensed tetrahedral frameworks," J. Chem. Soc., Dalton Trans. (2000) pp. 4227-4240.

* cited by examiner

*Primary Examiner* — Steven Bos
(74) *Attorney, Agent, or Firm* — Frost Brown Todd LLC (57) ABSTRACT

A mixture of Zinc Oxides or Hydroxides with Aluminum Hydroxides and Vanadium Oxide ($V_2O_5$) co-reacts in high temperature aqueous slurry to form highly crystalline forms of Hydrotalcite, containing the Decavanadate ion as a source of corrosion inhibition. The subject compositions, free of hexavalent chromium, are highly effective in providing blister-free corrosion prevention in typical coil and aerospace grade epoxy primer and color coat combinations.

14 Claims, 6 Drawing Sheets

NON-CHROMATE CORROSION INHIBITOR FORMULAS BASED ON HIGHLY CRYSTALLINE HYDROTALCITE ANALOGS

This application is based upon and claims priority from U.S. Provisional Patent Application No. 60/973,858, Boocock, filed Sep. 20, 2007, incorporated herein by reference.

FIELD OF INVENTION

This invention relates to corrosion inhibitive pigmentary compositions free of Chromium. More specifically, these compositions are essentially free of hexavalent chromium {Cr(VI)}. The inventive compositions are useful in coatings applied as the primer component of a coating system intended to prevent corrosion of Aluminum (2024-T3) or Hot-Dip Galvanized or Zn—Al coated (Galvalume) coil stock.

BACKGROUND OF THE INVENTION

Chromium in the form of Chromate ($CrO_4^{-2}$) is a widely employed and highly effective corrosion preventive pigment. It is the de facto standard for corrosion prevention in primers applied to aluminum, particularly aerospace aluminum stock (2024-T3, and certain 7000 series alloys for instance). In addition, hexavalent chromate in the form of Strontium Chromate is the benchmark for corrosion prevention in coil coating primers (whether based on Epoxy-Melamine, Polyester or other binder systems) when applied to Zinc, Zinc-Aluminum or similar galvanized or electro-galvanized coil stock.

There has been extensive activity to eliminate hexavalent chromium from these primer systems, which efforts are driven by two related impeti. First, Hexavalent Chromium is toxic; thus, efforts to identify a performance-equal substitute to Strontium Chromate are easily understood. Secondly, there are directives promoted in Europe that require a limit on Chromium content, such that a manufactured article may more readily be recycled.

For the foregoing reasons, there have been numerous academic research projects (see Progress in Organic Coatings, 47 (2003):174-182, Buchheit et al.), and an untold number of industry product development exercises devoted to finding a replacement for Strontium Chromate. There is also a substantial patent literature history describing some of these efforts by industry.

In almost every case examined however, there appears to be one or more flaws in the touted benefits of the described compounds. Typically, the claimed chromate-free inhibitor is in fact not demonstrated in a coating system, but rather in a primer alone. This may disguise a performance flaw, e.g., that the inhibitive pigment leads to blistering. Sometimes, the touted composition is offered based on data for a coating system that is applied only to ferrous metal surfaces. Though it may be free of chromium, the anti-corrosive pigment provides insufficient electrochemical over-potential to prevent corrosion of highly reactive metals such as Aluminum or Zinc. Finally, it is often the case that the benefit of a chrome-free anti-corrosive pigment is made on the basis of unrealistically short accelerated testing; which is deemed unreliable by those skilled in the art. Indeed, many patented offerings, when independently tested, fail to deliver the long duration of outstanding corrosion prevention expected of Strontium Chromate in benchmark accelerated tests.

The present invention overcomes these deficiencies in previous chrome-free anti-corrosive pigments. It provides proof that the inventive compositions are able to deliver performance on a par with Strontium Chromate when evaluated directly alongside the same in realistic coating systems, appropriate for the substrate and end-use application. The present invention does use a ratio of elements in its composition that has been previously disclosed. It differs from the prior disclosed systems in that this ratio of elements is used to make a highly crystalline form of an analog of Hydrotalcite, which contains therein, as a charge balancing ion, a reservoir of the corrosion preventive anion decavanadate. This is considered a Hydrotalcite analog as the other components of the pillared clay are made using Zinc and Aluminum hydroxides, rather than as in natural hydrotalcite Magnesium and Aluminum hydroxides. Previously disclosed were compounds that included the Zinc and Aluminum and Vanadium elements in an approximate range of composition $Zn_6Al_2V_{10}O_{28}(OH)n$ to $Zn_6Al_2V_{10}O_{28}(OH)y$. However, these compositions were all very amorphous, and contained substantial residual co-salts resulting from their means of synthesis. These salts (contaminants) lead to failure by blistering when such amorphous materials are used in full coating systems. Thus, it is not surprising that almost all the literature data describing these materials focuses on their use in primers alone.

The present invention provides a means to avoid the use of salts in the manufacture of such Zinc-Hydrotalcite compositions. As an outgrowth of this approach, the resulting compounds are highly crystalline in nature. Furthermore, due to the lack of tracer salt contaminants, their resistance to blistering in typical coating systems is greatly improved.

SUMMARY OF THE INVENTION

The present invention covers the chemistry, processes and means of application for an anti-corrosive pigment substantially free of hexavalent chromium. Said pigment may be used in direct substitution for Strontium Chromate in primers intended for zinc-coated or zinc-alloy coated coil stock. Said pigment may be used in direct substitution for Strontium Chromate in primers intended for Aluminum alloy surfaces.

The chemistry involves the reaction of Zinc oxides or hydroxides with Aluminum hydroxides in an aqueous slurry held at a temperature between 65° C. and 130° C. and a pressure between ambient and 5 MPa, with Vanadium Oxides (such as $V_2O_5$). Specifically, the acidic Vanadium Oxide digests the Zinc and Aluminum sources and self-assembles a highly crystalline form of a hydrotalcite consisting of a Zinc and Aluminum Hydroxide framework, contained within which is the Decavanadate anion ($V_{10}O_{28}^{-6}$).

The process is, as described above, a hydrothermal process; this process may be conducted under ambient pressure at temperatures up to the boiling point of the carrier fluid in which the slurry is made, or under pressure, as in a hydrothermal reactor, at temperatures above the boiling point of the carrier fluid under Standard Temperature and Pressure, STP.

This preferred form of the invention affords a deeply colored pigment which is essentially free of extraneous soluble salts. This distinguishes the composition formed from that made by earlier disclosed methods of synthesis, such as that of Buchheit.

In addition, the preferred form of the compositions made in accordance with this invention are highly crystalline, unlike the above-referenced forms of "Zinc-Hydrotalcite" made by precipitation from solutions of metal salts. This provides added benefits in terms of the tractability in use of the preferred compositions. The highly crystalline nature of the inventive materials makes them less demanding of coating vehicle when incorporated into a primer.

It should be noted that Hydrotalcite compounds, including those that incorporate polyoxometallate anions are well known, particularly for those that are built around the "natural" framework stoichiometry of $Mg_6:Al_2$ to $Mg_6:Al_3$ ratios. However, it should be made clear that almost all these materials fall into two broad classes of application:

A—use as a carrier for, or specifically a precursor to, materials with catalytic applications, or;

B—use as an anion scavenger in halogen-containing polymer formulations, particularly those based on polyvinyl chloride.

The range of such materials is exemplified by compositions described in the following U.S. patents, incorporated herein by reference, U.S. Pat. No. 4,774,213 (Schneider et al.), issued Sep. 27, 1998: U.S. Pat. No. 4,843,168 (Drezdon et al.), issued Jun. 27, 1989; U.S. Pat. No. 5,246,899 (Bhattacharyya), issued Sep. 21, 1993; U.S. Pat. No. 5,728,363 (Martin et al.), issued Mar. 17, 1998; U.S. Pat. No. 5,730,951 ("Martin et al.), issued Mar. 24, 1998; U.S. Pat. No. 5,939,353 (Battacharyya et al), issued Aug. 17, 1999; U.S. Pat. No. 6,156,696 (Albers et al), issued Dec. 5, 2000; U.S. Pat. No. 6,221,472 (Nosu et al), issued Apr. 24, 2001; U.S. Pat. No. 6,479,421 (Vierheilig), issued Nov. 12, 2002; U.S. Pat. No. 6,929,736 (Vierheilig), issued Aug. 16, 2005; U.S. Pat. No. 7,022,302 (Oza et al), issued Apr. 4, 2006; and U.S. Pat. No. 7,112,313 (Vierheilig), issued Sep. 26, 2006.

DETAILED DESCRIPTION OF THE INVENTION

In accordance with the foregoing summary, the following represents a detailed description of preferred embodiments of the invention.

EXAMPLE 1

A slurry is formed of Zinc Oxide (ZnO), Aluminum Hydroxide $(Al(OH)_3)$ and Vanadium Pentoxide in water in an elemental ratio of Zn:Al:V of 6:2:10. The ratio of the mass of water to the total mass of precursor oxides and hydroxides is no less than about 4:1. The slurry is homogenized by mechanical stirring and then raised in temperature by any convenient means to between 65° C. and 80° C. At this temperature, the solubility of the Vanadium Oxide in the reaction fluid becomes sufficiently high that polynuclear vanadium oxoanions predominate, such as the decavanadate ion $\{V_{10}O_{28}^{-6}\}$. Over a period of several hours, but less than a day, the reaction between the individual precursor oxides and hydroxides proceeds to completion. This event is accompanied by a significant increase in temperature of the slurry. A bright brick-red solid cake forms. When recovered and dried, the mass of product is typically 96% of theory for a material having a stoichiometry of $Zn_6Al_2V_{10}O_{28}(OH)_{12}$. The product may be reduced to a pigmentary form suitable for incorporation into anti-corrosive primer formulas by any common means of comminution.

EXAMPLE 2

A slurry is formed of Zinc Oxide (ZnO), Aluminum Hydroxide $(Al(OH)_3)$ and Vanadium Pentoxide in water in an elemental ratio of Zn:Al:V of 6:3:10. The ratio of the mass of water to the total mass of precursor oxides and hydroxides is no less than about 4:1. The slurry is homogenized by mechanical stirring and then raised in temperature by any convenient means to between 65° C. and 80° C. At this temperature, the solubility of the Vanadium Oxide in the reaction fluid becomes sufficiently high that polynuclear vanadium oxoanions predominate, such as the decavanadate ion $\{V_{10}O_{28}^{-6}\}$. Over a period of several hours, but less than a day, the reaction between the individual precursor oxides and hydroxides proceeds to completion. This event is accompanied by a significant increase in temperature of the slurry. A bright brick-red solid cake forms. When recovered and dried, the mass of product is typically 96% of theory for a material having a stoichiometry of $Zn_6Al_3V_{10}O_{28}(OH)_{15}$. The product may be reduced to a pigmentary form suitable for incorporation into anti-corrosive primer formulas by any common means of comminution.

EXAMPLE 3

This example is conducted with a ratio of elements identical with that used in Example 1, but the reaction is run under high temperature and pressure conditions (130° C., 5 MPa, autogenous pressure). The ratio of water to solids by weight may be reduced to 2:1 in such a high-temperature hydrothermal reactor.

EXAMPLE 4

Figure 3:
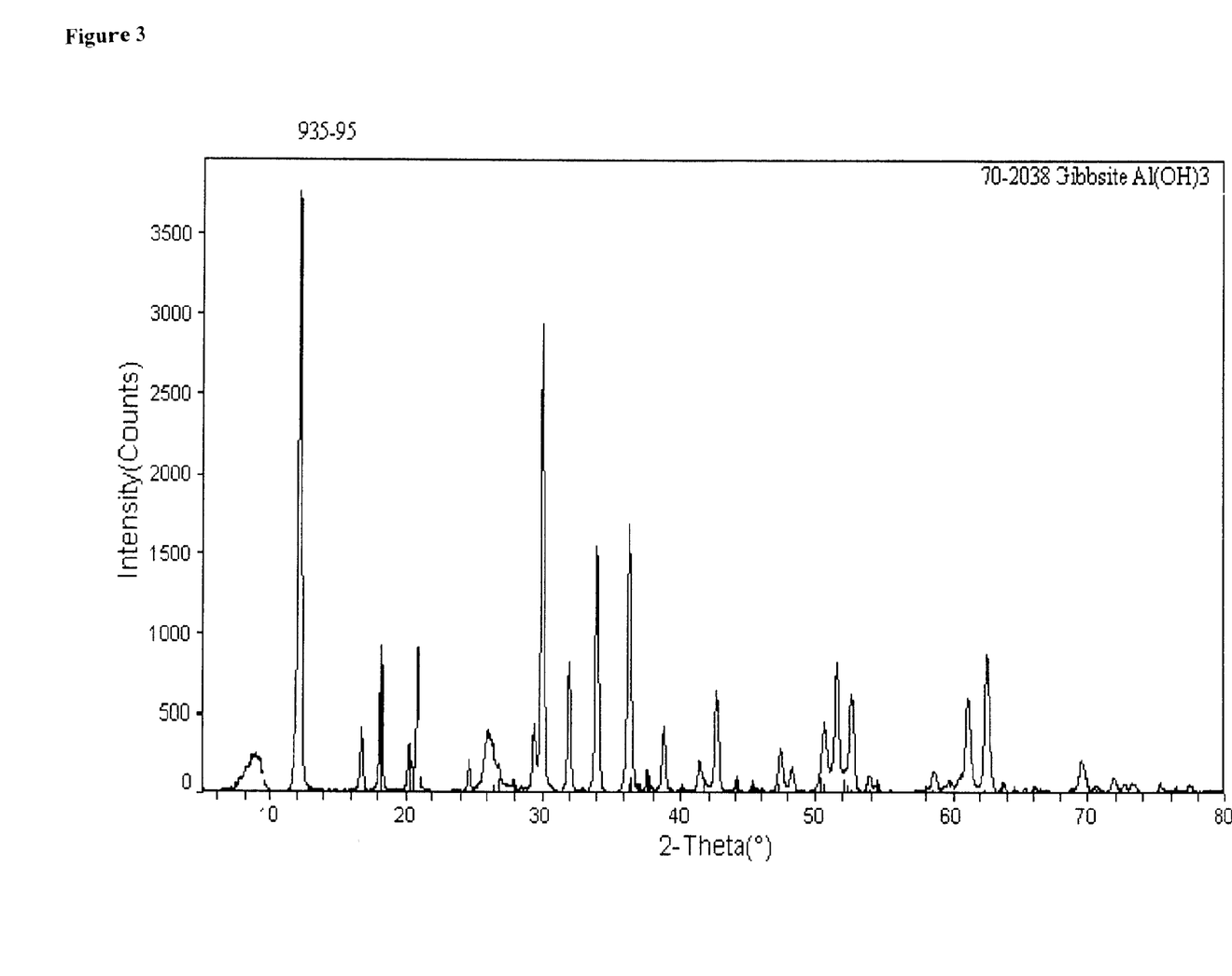
FIG. 3—XRD Pattern for Hydrothermal Route Zinc Hydrotalcite Decavanadate—Example 4.

This example is conducted with a ratio of elements identical with that used in Example 2, but the reaction is run under high temperature and pressure conditions (130° C., 5 MPa, autogenous pressure). The ratio of water to solids by weight may be reduced to 2:1 in such a high-temperature hydrothermal reactor. See FIG. 3.

EXAMPLE 5

This example is conducted in accordance with Example 1, but in replacement of a portion of the Zinc Oxide, a one-half mole equivalent of Zirconium Hydrate is employed. The resulting orange-red powder is obtained in high (>90%) yield.

EXAMPLE 6

This example is conducted in accordance with Example 1, but in replacement of a portion of the Zinc Oxide, a one-half mole equivalent of Cerium Hydrate is employed. The resulting buff-color powder is obtained in high (>95%) yield.

EXAMPLE 7

Figure 1:
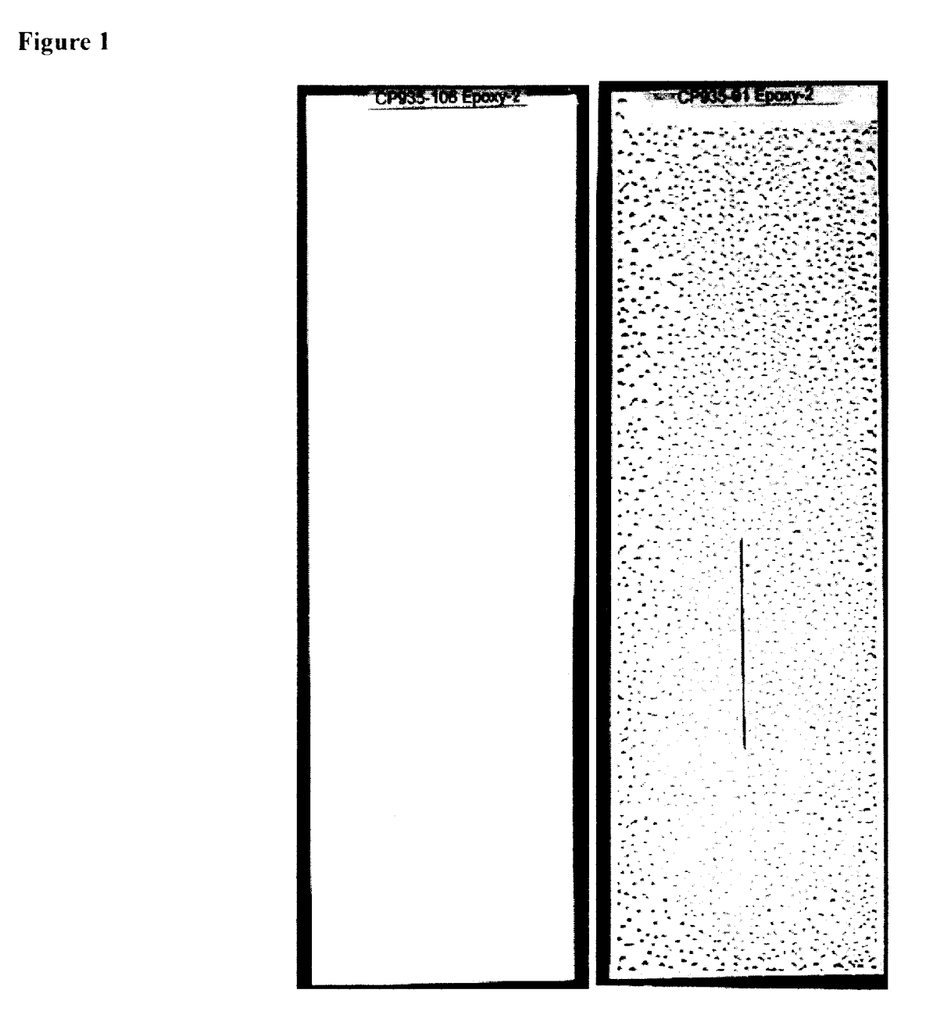
FIG. 1—Improved Blistering Resistance of Inventive Composition (Example 1—sample #106) vs Previously Reported Amorphous Zinc Hydrotalcite Decavanadate (Example 7—sample #91) in Salt Fog Exposure.
Figure 2:
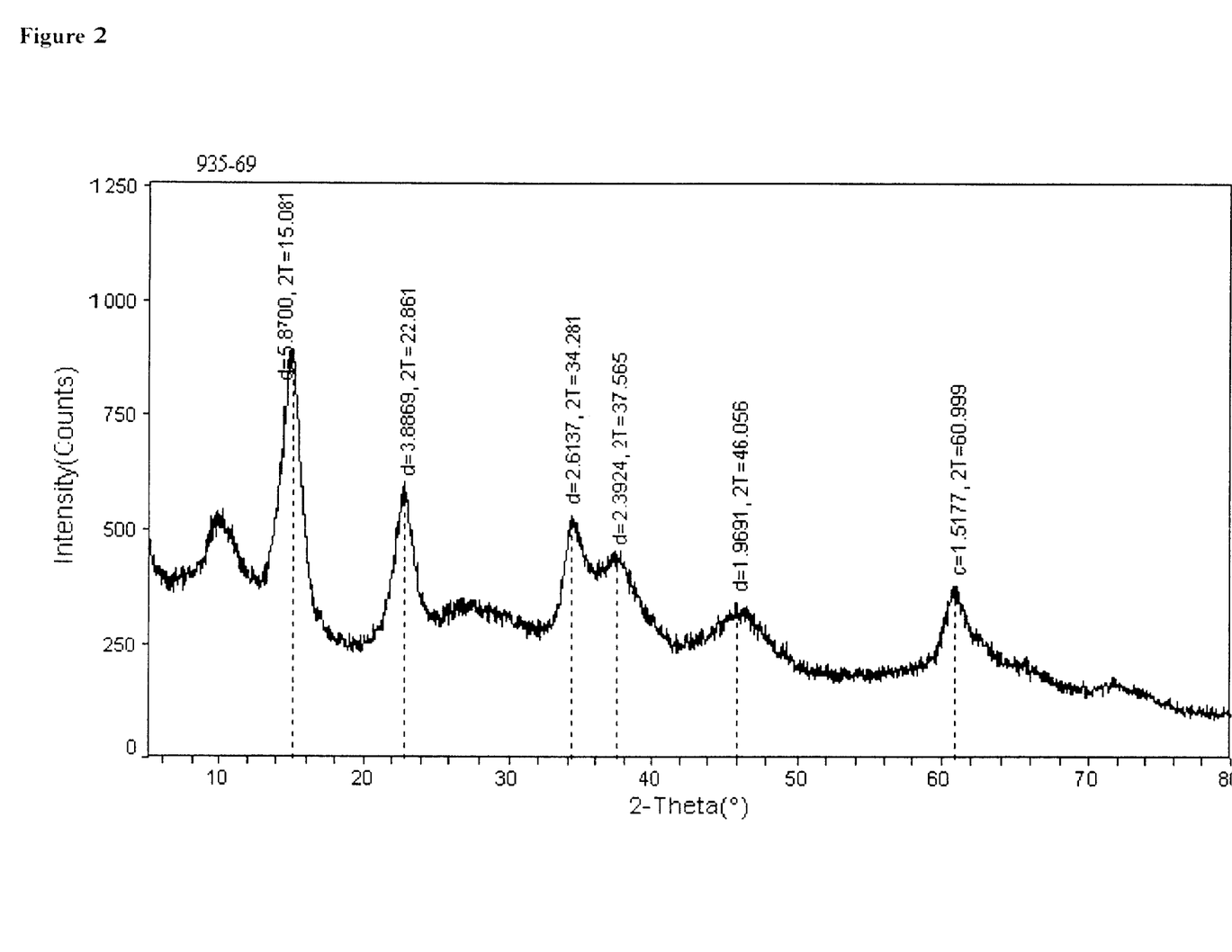
FIG. 2—XRD Pattern for Metathetical Route Zinc Hydrotalcite Decavanadate—Example 7.

An example of the previously disclosed (prior art) form of Zinc Hydrotalcite Decavanadate is made in accordance with the process described by Buchheit, Scully and others. A solution of salts of Zinc Nitrate and Aluminum Nitrate is mixed with a solution of Sodium Vanadate, to which previously has been added sufficient acid to promote the generation of the deeply orange decavanadate hexa-anion. As the acidic solution of Zinc and aluminum nitrate is added, the pH of the resulting yellow slurry is maintained within a pH range of 5.5-6.0 through drop-wise addition of Sodium Hydroxide solution. Upon completion of the mixture of the two precursor solutions, a yellow slurry develops. This is then allowed to equilibrate at 65°-75° C. overnight. The resulting product is recovered by filtration, then repeatedly washed until wash waters have a conductivity of less than 150 uS. This washing step consumes 12 times the original volume of the slurry from which the yellow filter-cake is recovered. The product is dried to constant weight for a yield of 80% of an orange-yellow powder based on a stoichiometry of $Zn_6Al_2V_{10}O_{28}(OH)_{12}$. See FIG. 2.

EXAMPLE 8

Pigments made in accordance with Examples 1 through 4 are incorporated into coil primers in accordance with the formula in Table 1 As positive control, a Strontium Chromate pigmented primer is employed. As a negative control, a primer composition in which all anti-corrosive materials are substituted for inert pigments (TiO$_2$ and Talc) is employed. Each primed surface is then top coated with a compatible coil coating system as shown in Table 2. The relative edge undercutting and scribe undercutting performance of these systems after 1,000 Hours of salt fog exposure is depicted in Table 4.

EXAMPLE 9

Pigments made in accordance with Examples 1 through 4 are incorporated into a 2-pack Epoxy coating applied to Aluminum 2024-T3 panels. The general primer formula used is depicted in Table 3. As positive control, a Strontium Chromate pigmented primer is employed. As a negative control, a primer composition in which all anti-corrosive materials are substituted for by inert pigments (TiO$_2$ and Talc) is employed. Each primed surface is then top coated with a compatible Epoxy top-coat. The relative edge undercutting and scribe undercutting performance of these systems after 6,000 Hours of salt fog exposure is depicted in Table 5.

TABLE 5

Scribe and Blistering Data for 2-Component Epoxy Samples applied to Aluminum 2024-T3 (A600 Treatment). (6,000 Hours)

| Example | Scribe Undercutting | Blistering |
|---|---|---|
| 1 | 0.1 mm | none |
| Positive Control | 0.2 mm | none |
| Negative Control | 1.2 mm | 6 - many |

EXAMPLE 10

Figure 4A:
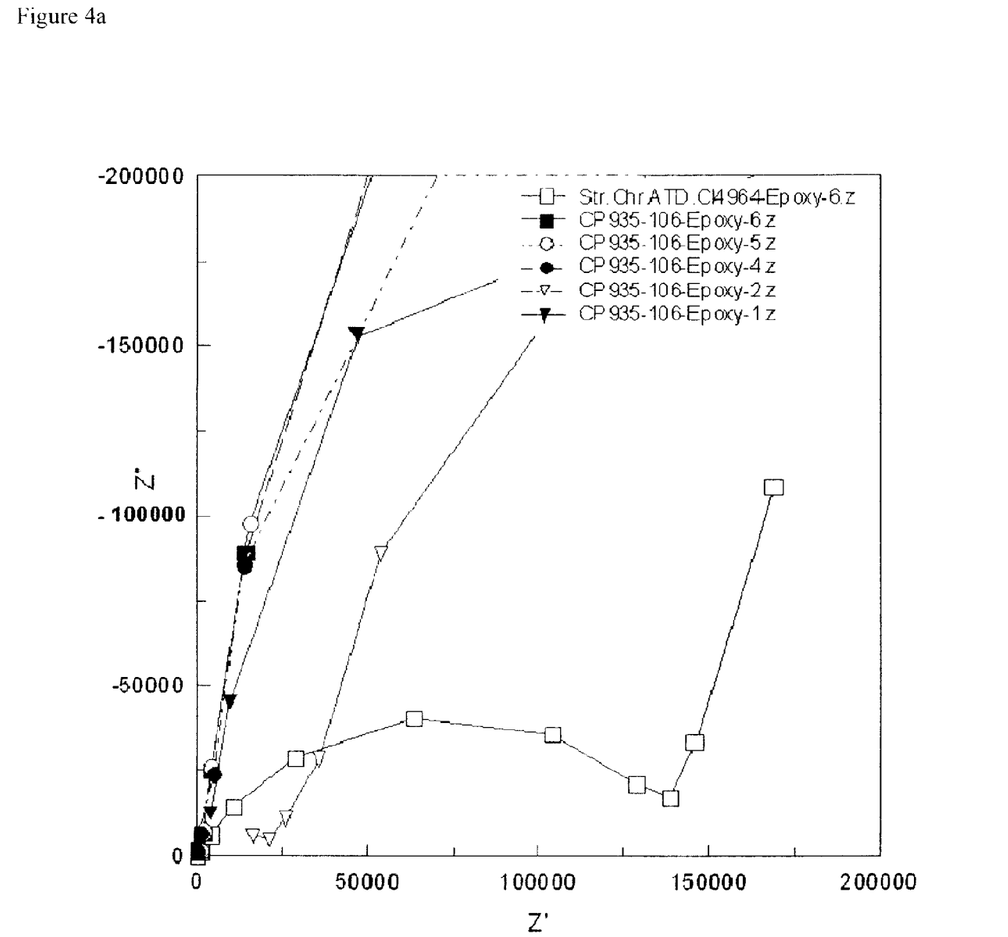
FIGS. 4a, 4b, 4c—EIS Data for Positive Control (SrCrO4) and Example 4 and Example 7 in 2-Component Epoxy over Aluminum 2024-T3 with A600 Surface Treatment.
Figure 4B:
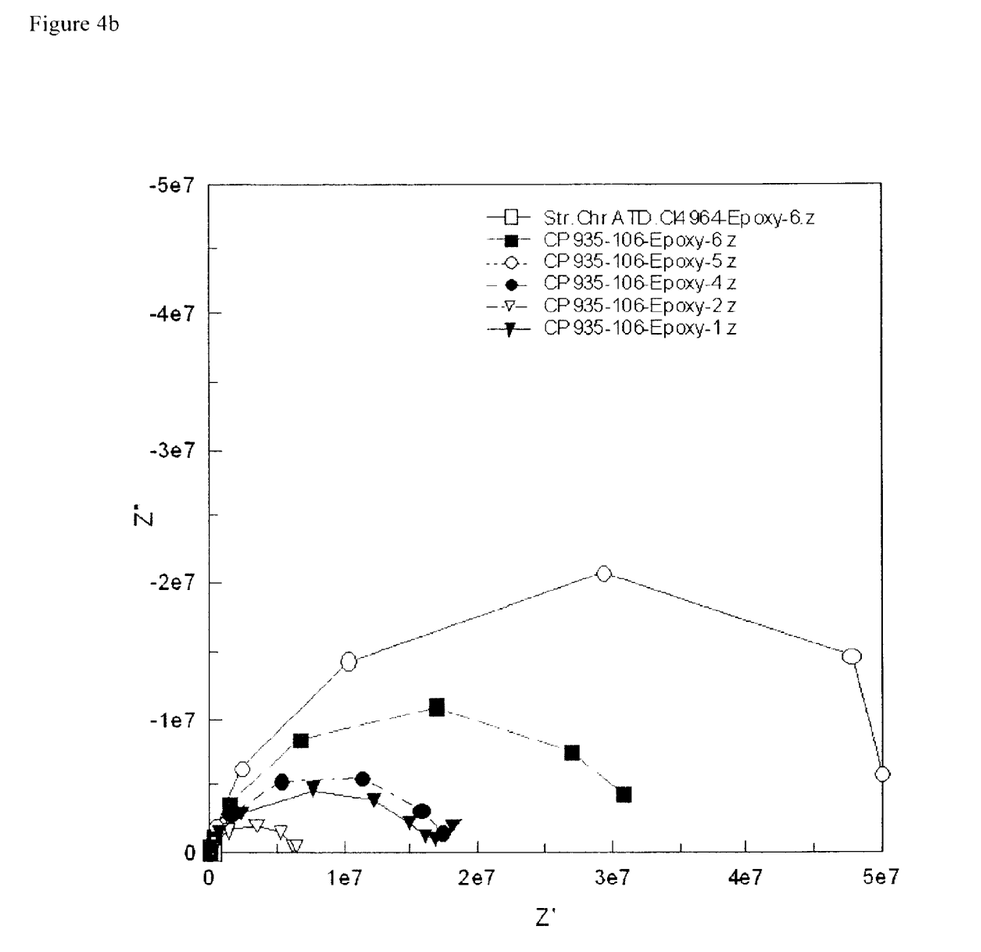
Figure 4C:
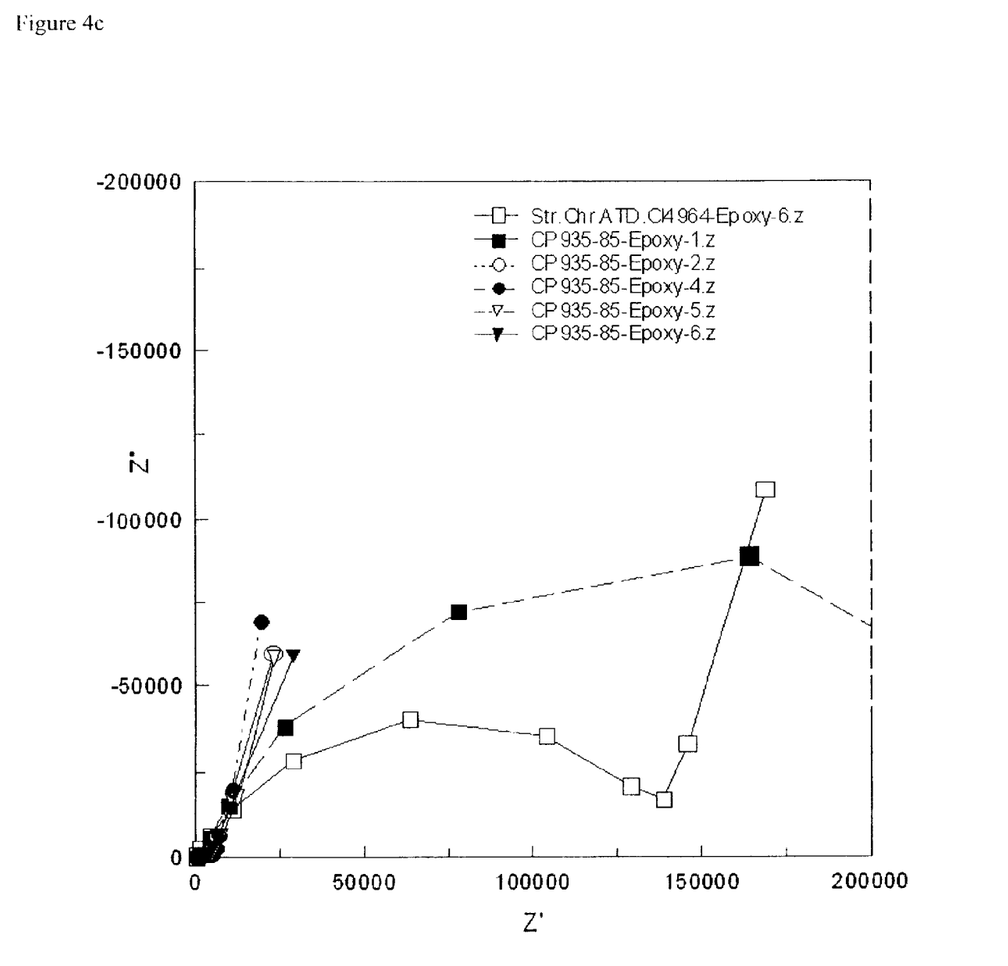

Panels made using the primer and topcoat formulas described in Example 8 are also evaluated using electrochemical impedance spectroscopy. The high permeation resistance and absence of signals associated with under-film corrosion, or the presence of salts that would provide higher conductance is seen in FIGS. 4-a through 4-c, respectively. These good results for primer topcoats made using the anti-corrosive pigments of Examples 1 through 4 can be compared to the relatively poor resilience exhibited by the test sample made using the prior disclosed composition (Example 7), seen in FIG. 4c.

TABLE 1

Coil Coating Primer System Positive Control

| Component | Wt | Solids | |
|---|---|---|---|
| Dynapol LH820-04 | 50 | 0.5 | 25 |
| CaboSil M-5 | 0.4 | 1 | 0.4 |
| Filler-Talc | 4 | 1 | 4 |
| Tiona 696 | 8 | 1 | 8 |
| SrCrO4 | 6.2 | 0.65 | 4.03 |
| MPA | 7.6 | 0 | 0 |
| Make Grind in Eiger Mill to Hegman of 7 | | | |
| Epikote 1004 | 6 | 0.5 | 3 |
| Vestanat EP-B 1481 | 6 | 0.65 | 3.9 |
| Dabco T12N | 1 | 0.1 | 0.1 |
| Nacure 1953 (5% in IPA) | 2 | 0.05 | 0.1 |
| Cymel 303 (80% in IPA) | 2.5 | 1 | 2.5 |
| Byk 355 (20% in Naptha) | 3 | 0.1 | 0.3 |
| Naptha 150 | 3.3 | 0 | 0 |
| | 100 | 6.55 | 51.33 |

Let Down on Cowles with the above components

Samples using examples of the inventive pigments from Examples 1 through 4 and prior art pigment Example 7 are made by substitution of Strontium Chromate on a weight to weight basis. To maintain the ratio of Critical Pigment Volume to Pigment Volume Concentration within the bounds defined by the above formula, adjustments are also made in the loading of Talc or TiO$_2$ (Kronos 2059) in the above formula.

Primer films are drawn down on Hot-Dip Galvanized or Galvalume Panels, to which a Henkel 1421 pretreatment has been applied, at 7-microns target DFT using a wire-wound rod. The films are cured for 35-40 seconds with an oven temperature of 343° C., to achieve a Peak Metal Temperature of 225° C.

TABLE 2

Polyester Topcoat Formula

| Grind | CL | Grams |
|---|---|---|
| Kronos 2310 | 5706 | 650 |
| Bayferox M130 | | 65 |
| Dynapol LH530-02 | 4376 | 321.75 |
| Solvesso 200 | 4533 | 125.6 |

| Letdown Base | Grams | Solids |
|---|---|---|
| Dynapol LH530-02 | 300 | 60% |
| Cymel 303 | 105 | 99% |
| Solvesso 200 | 150 | 0% |
| BYK 392 | 10 | 50% |
| | 565 | |

| | Grams |
|---|---|
| Grind | 31.0 |
| Letdown Base | 36.0 |

Hegman 5-6
Eiger milled continuously at 3500 rpm using 1.0-1.2 SEPR beads.
30wwr, 50 sec cure at 343° C.

TABLE 3

2-Component Epoxy Primer Formula

| Material | Part A | |
|---|---|---|
| Epon 828 | 157.95 | 17.02 |
| Heloxy Modifier 8 | 30.01 | 3.23 |
| Suspeno 201-NBA | 5.48 | 0.59 |
| Nicron Talc 503 | 43.63 | 4.70 |
| N-Butyl Acetate | 322.30 | 34.73 |
| Gasil 23F Silica Gel | 27.05 | 2.91 |
| Kronos 2310 | 21.16 | 2.28 |
| Pigment | 300.50 | 32.38 |
| Disperbyk 111 | 20.000 | 2.15 |
| Grind Above to Hegman of 5-6 | | |

TABLE 3-continued

2-Component Epoxy Primer Formula

| Material Part B | Part B | |
|---|---|---|
| Epikure 3155 HY283 | 711.03 | 86.28% |
| Tertiary Amine K54 | 55.22 | 6.70% |
| NBA | 57.85 | 7.02% |

Mix Part A and B in a ratio of 5:1 by weight
Apply by wire-wound rod to target DFT of 1.0-1.5 mils The above generic formula is used for the generation of all primer samples including Strontium Chromate, Examples 1 through 4 and Example 7 above, and a negative control wherein all the Strontium Chromate is substituted for by Tiona 696 $TiO_2$. This same negative control version is also used as the topcoat for all samples.

TABLE 4

Edge Undercutting LH820 Polyester Coil Coatings on Henkel 1421 treated Hot-dip galvanized coil stock.

| Sample | Example Method | 101 h | 147 h | 218 h | 334 h | 406 | 482 h | 1016 h |
|---|---|---|---|---|---|---|---|---|
| 106 A1 | 1 | 0 | 0 | 0 | 3 | 5 | 5 | 7 |
| 106 A2 | 1 | 0 | 0 | 0 | 2 | 5 | 6 | 6 |
| 106 D1 | 1 | 0 | 0 | 2 | 2 | 4 | 4 | 5 |
| 106 D2 | 1 | 0 | 2 | 3 | 4 | 6 | 9 | 11 |
| 127C D1 | 1 | 0 | 0 | 0 | 3 | 4 | 5 | 2 |
| 127C D2 | 1 | 0 | 0 | 1 | 4 | 7 | 9 | 5 |
| 129-1 D1 | 1 | 1 | 3 | 4 | 4 | 7 | 8 | 9 |
| 129-1 D2 | 1 | 0 | 0 | 0 | 3 | 3 | 3 | 6 |
| 140-1 A1 | | 0 | 0 | 0 | 1 | 1 | 3 | 8 |
| 140-1 A2 | | 0 | 2 | 2 | 7 | >10 | >10 | 9 |
| 140-2 A1 | | 0 | 0 | 1 | 3 | 6 | 6 | 30 |
| 140-2 A2 | | 0 | 2 | 2 | 3 | 4 | 5 | 10 |
| 140-3 A1 | | 0 | 0 | 1 | 2 | 3 | 4 | 13 |
| 140-3 A2 | | 0 | 0 | 2 | 3 | 5 | 9 | 14 |
| 140-4 A1 | | 0 | 2 | 3 | 5 | 6 | 7 | 9 |
| 140-4 A2 | | 0 | 0 | 3 | 9 | 8 | 8 | 10 |
| 140-5 A1 | | 0 | 1 | 3 | 8 | 6 | 7 | 6 |
| 140-5 A2 | | 0 | 0 | 0 | 3 | 4 | 8 | 7 |
| 140-6 A1 | | 0 | 0 | 0 | 2 | 2 | 6 | 8 |
| 140-6 A2 | | 0 | 1 | 1 | 2 | 3 | 6 | 10 |
| 140-7 A1 | | 0 | 1 | 2 | 2 | 3 | 3 | 8 |
| 140-7 A2 | | 0 | 2 | 2 | 7 | 8 | 10 | 9 |

The trials 140-1 through 140-7 are commercial anti-corrosive pigments.

140-1 is Strontium Chromate. 140-2 uses an equal weight of Halox 400 in place of Strontium Chromate (i.e., 100% Halox 400). 140-3 uses an equal weight of the following mixture: Halox 400 (5%) Halox 650 (95%) in place of Strontium Chromate. 140-4 uses Heucophos SAPP pigment as a 1:1 substitute for Strontium Chromate (i.e., 100% Heucophos SAPP). 140-5 uses Heucophos SRPP in place of Strontium Chromate 1:1 by weight (i.e., 100% Heucophos SRPP). 140-6 uses an equal weight of the following mixture in place of Strontium Chromate Heucorin RZ (5%) Heucophos SAPP (95%). 140-7 uses an equal weight of the following mixture in place of Strontium Chromate, Heucorin RZ (5%) Heucophos SRPP (95%).

What is claimed is:

1. A crystalline zinc aluminum vanadium hydrotalcite composition that is substantially free of trace salts, suited for use as an anti-corrosive pigment.

2. A composition according to claim 1 that lies between the following elemental ratios: Zn6-Al2-V10 and Zn6-Al4-V10, with charge being balanced by Oxygen or Hydroxyl radicals, which is substantially free of trace salts.

3. A composition according to claim 2 having the XRD pattern shown in FIG. 3.

4. A coil-coating primer composition which incorporates the composition according to claim 2.

5. A two-component epoxy primer composition which incorporates the composition according to claim 2.

6. Highly crystalline forms of hydrotalcite which contains decavanadate ion, and is substantially free of hexavalent chromium.

7. The highly crystalline forms of hydrotalcite according to claim 6 which has the XRD pattern shown in FIG. 3.

8. A method of making the material of claim 6 by co-reacting a mixture of zinc oxides and/or zinc hydroxides, with aluminum hydroxides and vandium oxide, in a high temperature aqueous slurry.

9. The method of claim 8 wherein the reaction temperature is between 65° C. and 130° C.

10. The method of claim 9 wherein the reaction takes place at a pressure between ambient and 5 mPa.

11. The method of claim 10 wherein the reaction temperature is between 65° C. and 80° C.

12. The method of claim 10 wherein the elemental ratio is between Zn6-Al2-V10 and Zn6-Al4-V10.

13. Zinc or Zinc-Aluminum coated coil stock which incorporates the composition of claim 4 as a primer.

14. Aerospace grade aluminum alloy topcoated with a color coat, which incorporates the composition of claim 5 as a primer.

* * * * *